(12) United States Patent
Perry et al.

(10) Patent No.: US 6,749,460 B2
(45) Date of Patent: Jun. 15, 2004

(54) APPARATUS AND METHOD FOR PREVENTING SOLDERING MATERIAL MIGRATION

(75) Inventors: Paul D. Perry, Chatham (CA); Dennis Alan Nocent, Belle River (CA)

(73) Assignee: Siemens VDO Automotive Inc., Chatham, CA (US)

( * ) Notice: Subject to any disclaimer, the term of this patent is extended or adjusted under 35 U.S.C. 154(b) by 0 days.

(21) Appl. No.: 09/893,524

(22) Filed: Jun. 29, 2001

(65) Prior Publication Data

US 2003/0001001 A1 Jan. 2, 2003

(51) Int. Cl.[7] ................................................ H05K 1/00
(52) U.S. Cl. ....................................................... 439/526
(58) Field of Search .............................. 439/70, 72, 73, 439/66, 65, 330, 331, 525, 530, 620

(56) References Cited

U.S. PATENT DOCUMENTS 5,007,844 A * 4/1991 Mason et al. .................. 439/68

OTHER PUBLICATIONS

U.S. patent application No. 09/542,052, Paul D. Perry et al., filed Mar. 31, 2000.

* cited by examiner

Primary Examiner—Ross Gushi

(57) ABSTRACT

A mounting arrangement and a method for preventing a migration of soldering materials from an electric terminal into the body of an electric device via electric contacts that project from the body of the electric device. The mount comprises a platform that is adapted for spacing a base of the electric device from the electric terminal. The method comprises providing a surface of the electrical terminal with a depressed surface portion. The platform at least partially overlays the depressed surface portion and supports the body of the electric device such that the electric contacts project toward the depressed surface portion. Soldering materials are used to electrically connect the electric contact to the depressed surface portion.

19 Claims, 3 Drawing Sheets

APPARATUS AND METHOD FOR PREVENTING SOLDERING MATERIAL MIGRATION

FIELD OF THE INVENTION

This disclosure generally relates to an apparatus and method for preventing a migration of soldering materials from an electric terminal into the body of an electric device. In particular, this disclosure is directed to a mounting arrangement and method for mechanically supporting and electrically connecting a tactile switch. The mounting arrangement and method according to this disclosure prevent the migration, via electric contacts projecting from the body of the switch, of solder or flux into the body of the switch.

BACKGROUND OF THE INVENTION

An evaporative emission control system for a vehicle can include an integrated pressure management apparatus (IPMA). An IPMA is disclosed, for example, in U.S. patent application Ser. No. 09/542,052, filed Mar. 31, 2000, and which is incorporated by reference herein in its entirety. This IPMA can perform several functions including system leak detection. Briefly, a switch can be activated indicating displacement of a pressure operable device in response to a negative pressure level in a charcoal canister. A properly performing, i.e., sealed, evaporative system should at least maintain the negative pressure level. However, if the evaporative system has a large enough leak, the evaporative system will not maintain switch activation. This switch can be a tactile switch that must be mechanically and electrically connected with respect to the IPMA.

It is believed that soldering is one technique for providing a mechanical and electrical connection. Conventionally, a switch includes a plurality of electrical contacts that project from a body. Using known soldering materials, e.g., flux and solder, and methods, the electrical contacts are soldered to electric terminals. However, it is believed that these soldering materials, especially flux, migrate along the electrical contacts to inside the switch through small gaps between the electrical contacts and the body. The presence of these soldering materials inside the switch is believed to adversely affect operation of the switch.

Therefore, it is believed that there is a need to prevent, or at least reduce, the migration of soldering materials.

SUMMARY OF THE INVENTION

The present invention provides a mount for an electrical device. The electrical device includes a body and a plurality of electric contacts. The body has a base and at least one lateral face extending from the base. The plurality of electric contacts project a distance from the base. The mount comprises an electric terminal and a platform. The electric terminal is adapted to be soldered to at least one of the plurality of electric contacts. The platform is adapted for spacing at a second distance the base from the electric terminal. The second distance that is substantantially equal to the first distance.

The present invention also provides an arrangement forming a mechanical and an electrical connection. The arrangement comprises an electric switch, a plurality of electric terminals extending parallel to a first axis, and a platform. The electric switch includes a body having a base, and a plurality of electric contacts. The plurality of electric contacts project a distance from the base. Each of the plurality of electric terminals include first, second, and third portions. The first portion has a first rectangular cross-section that is oriented transversely with respect to the first axis. The first rectangular cross-section has a first height measured parallel to a second axis that is perpendicular to the first axis, and has a first width measured parallel to a third axis that is orthogonal to the first and second axes. The second portion has a second rectangular cross-section that is oriented transversely with respect to the first axis. The second rectangular cross-section has a second height measured parallel to the second axis and has a second width measured parallel to the third axis. The second rectangular cross-section is substantially congruent to the first rectangular cross-section. The third portion has a third rectangular cross-section that is oriented transversely with respect to the first axis. The third rectangular cross-section has a third height measured parallel to the second axis and has a third width measured parallel to the third axis. The third height is less than the first and second heights, and the third width is less than the first and second widths. The third portion is soldered to at least one of the plurality of electric contacts. The platform is contiguously sandwiched between the third portion of each of the plurality of terminals and the base of the electric switch. The platform has a platform height measured parallel to the second axis from the third portions to the base. The platform height is substantially equal to the distance the plurality of electric contacts project from the base.

The present invention also provides an integrated pressure management apparatus. The integrated pressure management apparatus comprises a housing, a pressure operable device, a switch, an electric terminal, and a platform. The housing defines an interior chamber, and includes first and second ports that communicate with the interior chamber. The pressure operable device separates the chamber into a first portion communicating with the first port and a second portion communicating with the second port. The pressure operable device permits fluid communication between the first and second ports in a first configuration and prevents fluid communication between the first and second ports in a second configuration. The switch signals displacement of the pressure operable device in response to negative pressure at a first pressure level in the first portion of the interior chamber. The switch includes a body having a base, and a plurality of electric contacts that project a first distance from the base. The electric terminal is soldered to at least one of the plurality of electric contacts. And the platform spaces at a second distance the base from the electric terminal. The second distance is substantantially equal to the first distance.

The present invention also provides a method of preventing a migration of soldering materials from an electric terminal into the body of an electric device. The migration occurs via an electric contact that projects from the body of the electric device. The method comprises providing a surface of the electrical terminal with a depressed surface portion; at least partially overlaying the depressed surface portion with a platform rising toward the surface of the electric terminal; contiguously supporting the body of the electric device on the platform such that the electric contact projects toward the depressed surface portion; and electrically connecting with the soldering materials the electric contact to the depressed surface portion.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

As it is used herein, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Figure 1:
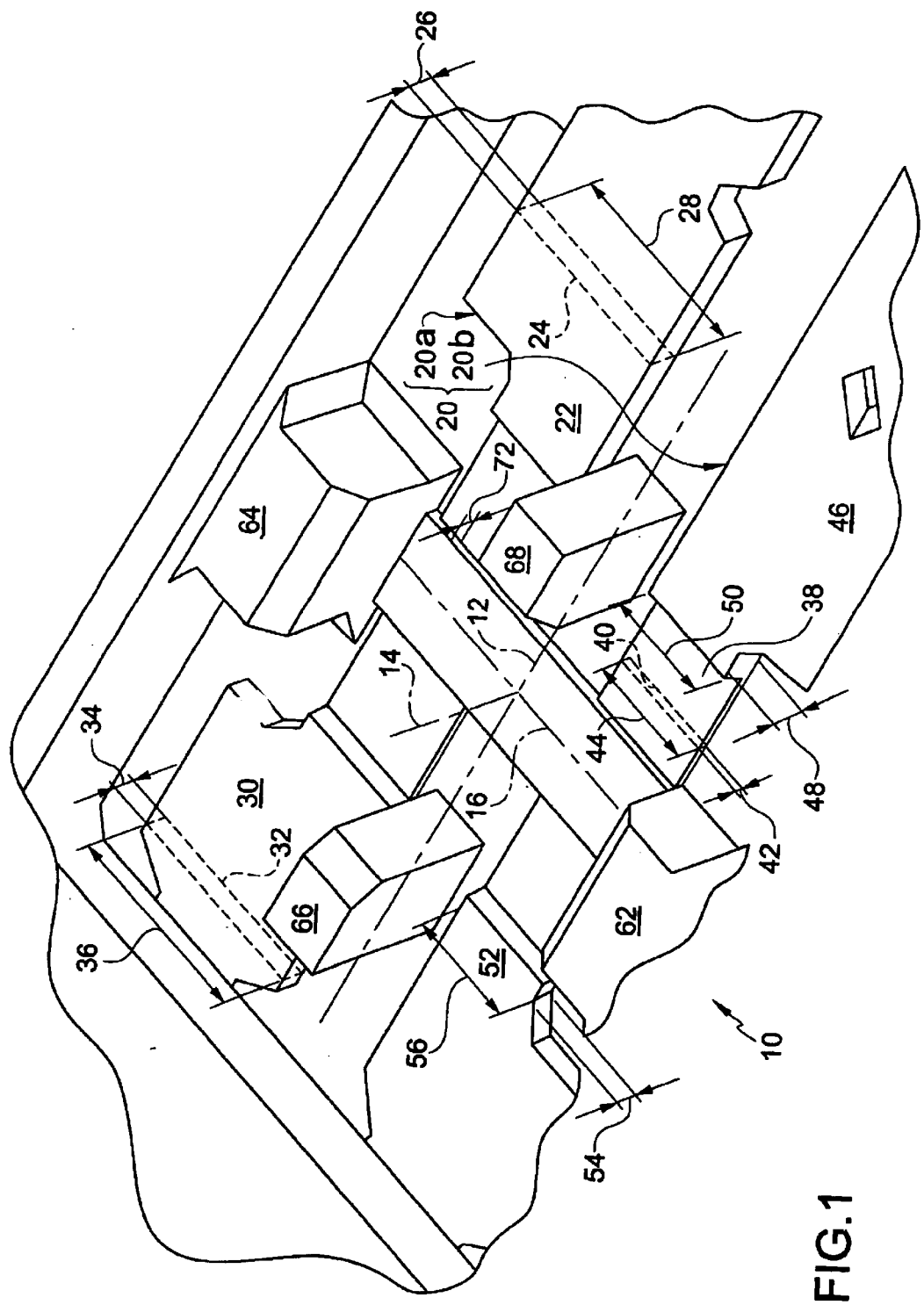
FIG. 1 is a perspective view of a mount for an electrical device.

Referring to FIG. 1, a mount 10 for an electrical device includes a plurality of electric terminals 20 (two are shown) and a housing 60 including a platform 70.

Figure 2:
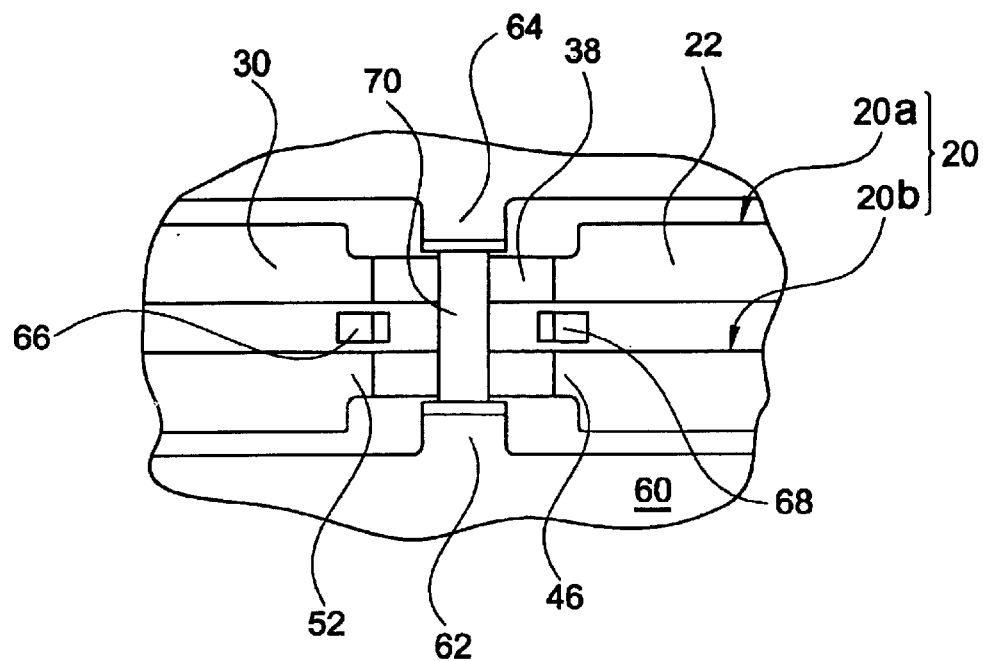
FIG. 2 is a plan view of the mount shown in FIG. 1.
Figure 3:
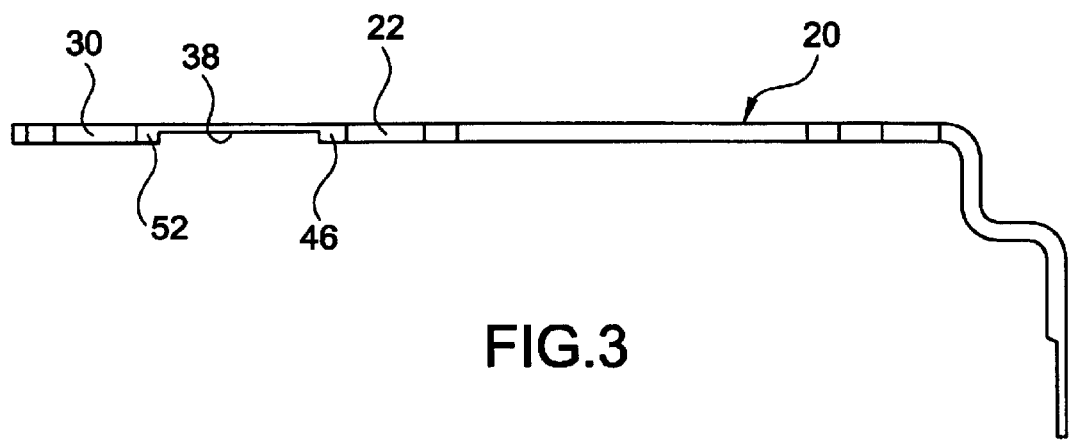
FIG. 3 is a detail view of a terminal for the mount shown in FIG. 1.

Referring additionally to FIGS. 2 and 3, a first electric terminal 20a and a second electric terminal 20b extend parallel to a first axis 12. As they are shown, the second electric terminal 20b is a mirror image of the first electric terminal 20a. Therefore, for the sake of clarity, the features that are common to both will only be described with respect to one or the other of the electric terminals 20.

Each electric terminal 20 can include a first portion 22, a second portion 30, and a third portion 38. The first portion 22 has a first rectangular cross-section 24 that is oriented transversely with respect to the first axis 12. The first rectangular cross-section 24 has a first height 26 measured parallel to a second axis 14, which is perpendicular to the first axis 12. The first rectangular cross-section 26 also has a first width 28 measured parallel to a third axis 16, which is orthogonal to the first axis 12 and to the second axis 14.

The second portion 30 has a second rectangular cross-section 32 that is oriented transversely with respect to the first axis 12. The second rectangular cross-section 32 has a second height 34 measured parallel to the second axis 14, and has a second width 36 measured parallel to the third axis 16. The first rectangular cross-section 24 and the second rectangular cross-section 32 can have substantially equal areas, or the second rectangular cross-section 32 can be substantially congruent to the first rectangular cross-section 24.

The third portion 38 has a third rectangular cross-section 40 oriented transversely with respect to the first axis 12. The third rectangular cross-section 40 has a third height 42 measured parallel to the second axis 14 and has a third width 44 measured parallel to the third axis 16. The third height 42 is less than the first height 26 or the second height 34, and the third width 44 is less than the first width 28 of the second width 36. As will be discussed with regard to FIG. 4, the third portion 38 of each electric terminal 20 is soldered to at least one of a plurality of electric contacts C for an electrical device.

Each electric terminal 20 can further include a first transition portion 46 and a second transition portion 52. The first transition portion 46 electrically and mechanically couples the first portion 22 and the third portion 38. The first transition portion 46 comprises a height 48 measured paralel to the second axis 14 that decreases from the first height 26 to the third height 42, and comprises a width 50 measured parallel to the third axis 16 that decreases from the first width 28 to the third width 44. The second transition portion 52 electrically and mechanically couples the second portion 30 and the third portion 38. The second transition portion 52 comprises a height 54 measured parallel to the second axis 14 that decreases from the second height 34 to the third height 42, and comprises a width 56 measured parallel to the third axis 16 that decreases from the second width 36 to the third width 44.

Figure 4:
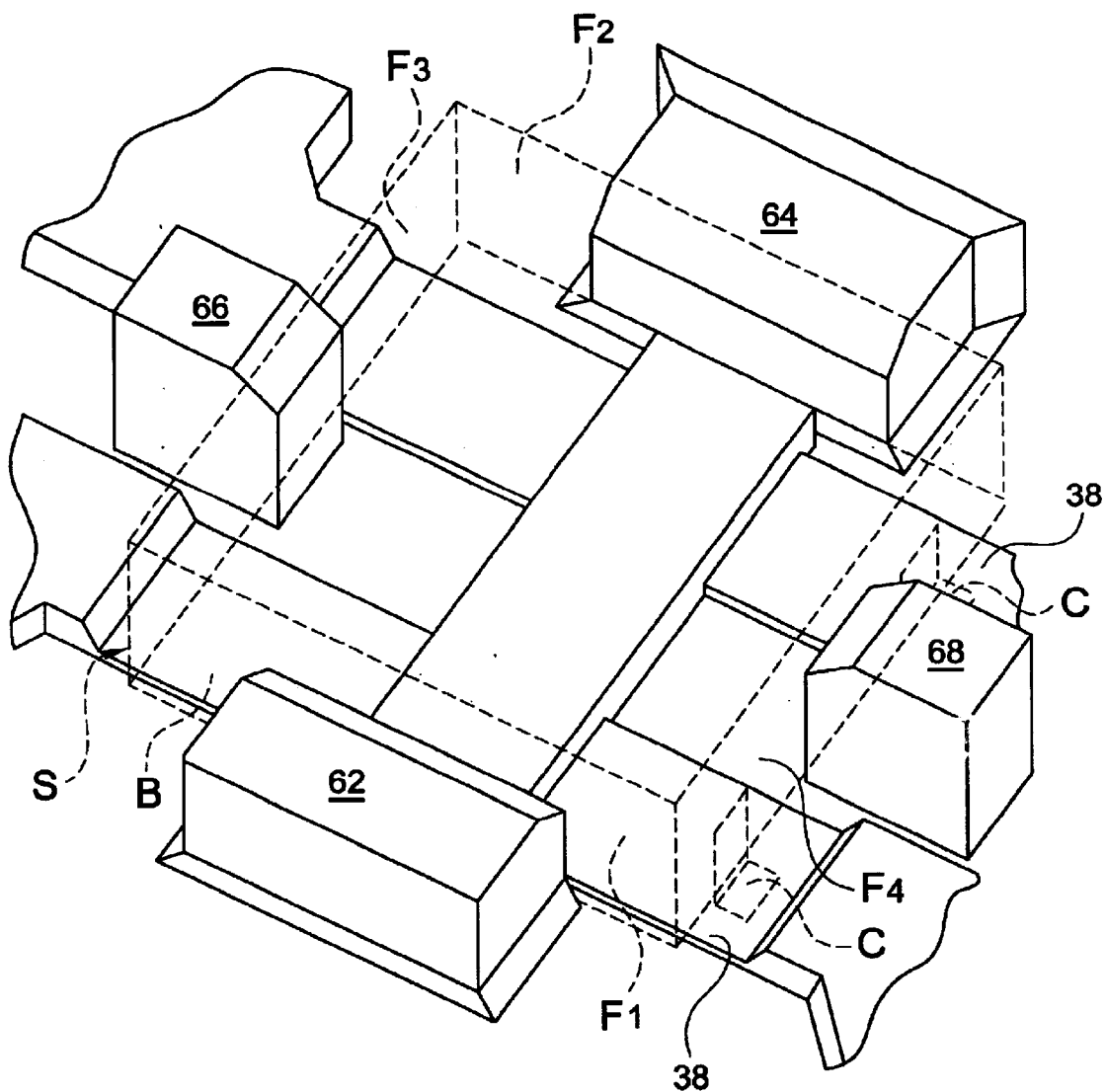
FIG. 4 is a perspective view showing a switch connected by the mount shown in FIG. 1.

Referring to additionally to FIG. 4, the housing 60 provides a foundation for supporting the terminals 20 and an electrical device S. For laterally locating the electric device S, i.e., against parallel movement with respect to an imaginary plane containing the first axis 12 and the third axis 16, the housing 60 can include a plurality of fingers 62, 64, 66, 68 that project from the housing 60 and contiguously engage the at least one lateral face F1, F2, F3, F4 of the electric device S. The fingers 62, 64, 66, 68 can be integrally molded with the housing 60 in a single, homogenous unit. The housing 60 preferably comprises a plastic material that is temperature resistant, electrically insulative plastic, and that can be molded.

The mounting arangement 10 reduces or prevents migration of the soldering materials, e.g., solder and especially flux, from the electric terminals 20 into the body of the electric device S. The migration that is prevented by the mounting arrangement 10 would otherwise occur via the electric contacts C that project through and from the electric device S. An example of a method using the mounting arrangement can include contiguously supporting the electric device S on the platform 70 such that the electric contacts C project toward the third portion 38, and electrically connecting with soldering materials the electric contacts C to the third portion 38.

By virtue of the space between the third portion 38 and the base B of the electric device S, as provided by the platform 70, and the projection of the electric contacts C below the base B, migration of soldering materials along electric contacts C can be reduced or prevented.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A mount for an electrical device including a body and a plurality of electric contacts, the body having a base and at least one lateral face extending from the base, and the plurality of electric contacts projecting a first distance from the base, the mount comprising:

a housing having a generally planar surface;

an electric terminal contiguous to the generally planar surface and extending over a portion of the generally planar surface, the electric terminal including a solder portion being adapted to be soldered to at least one of the plurality of electric contacts; and a platform continuous to the electrical terminal and adapted for spacing at a second distance the base from the solder portion of the electric terminal, the second distance being substantially equal to the first distance.

2. A mount for an electrical device including a body and a plurality of electric contacts, the body having a base and at least one lateral face extending from the base, and the plurality of electric contacts projecting a first distance from the base, the mount comprising:
- a housing having a generally planar surface;
- an electric terminal contiguous to the generally planar surface and extending over a portion of the generally planar surface, the electric terminal including a solder portion being adapted to be soldered to at least one of the plurality of electric contacts, wherein the electric terminal extends along an axis and comprises:
  - a first portion having a first cross-section transverse with respect to the axis; and
  - a second portion having a second cross-section transverse with respect to the axis, the second cross-section being smaller than the first cross-section; and
- a platform continuous to the electrical terminal and adapted for spacing at a second distance the base from the solder portion of the electric terminal, the second distance being substantially equal to the first distance.

3. The mount according to claim 2, wherein the platform is adapted to be contiguously sandwiched between the base and the second portion.

4. The mount according to claim 2, wherein the first and second cross-sections are generally rectangular, the first portion comprises a first width transverse with respect to the axis and a first height transverse with respect to the axis and perpendicular to the first width, and the second portion comprises a second width transverse with respect to the axis and a second height transverse with respect to the axis and perpendicular to the second width, and the second height is less than the first height.

5. A mount for an electrical device including a body and a plurality of electric contacts, the body having a base and at least one lateral face extending from the base, and the plurality of electric contacts projecting a first distance from the base, the mount comprising:
- an electric terminal being adapted to be soldered to at least one of the plurality of electric contacts, the electric terminal extending along an axis and including:
  - a first portion having a first generally rectangular cross-section transverse with respect to the axis, the first portion including a first width transverse with respect to the axis and a first height transverse with respect to the axis and perpendicular to the first width; and
  - a second portion having a second generally rectangular cross-section transverse with respect to the axis, the second cross-section being smaller than the first cross-section, the second portion including a second width transverse with respect to the axis and a second height transverse with respect to the axis and perpendicular to the second width, and the second height being less than the first height; and
- a platform adapted for spacing at a second distance the base from the electric terminal, the second distance being substantially equal to the first distance, the platform including a platform height transverse with respect to the axis, the platform height being substantially equal to a difference between the first and second heights.

6. A mount for an electrical device including a body and a plurality of electric contacts, the body having a base and at least one lateral face extending from the base, and the plurality of electric contacts projecting a first distance from the base, the mount comprising:
- an electric terminal being adapted to be soldered to at least one of the plurality of electric contacts, the electric terminal extending along an axis and including:
  - a first portion having a first generally rectangular cross-section transverse with respect to the axis, the first portion including a first width transverse with respect to the axis and a first height transverse with respect to the axis and perpendicular to the first width; and
  - a second portion having a second generally rectangular cross-section transverse with respect to the axis, the second cross-section being smaller than the first cross-section, the second portion including a second width transverse with respect to the axis and a second height transverse with respect to the axis and perpendicular to the second width, the second height being less than the first height, and the second width is less than the first width; and
- a platform adapted for spacing at a second distance the base from the electric terminal, the second distance being substantially equal to the first distance.

7. The mount according to claim 6, wherein the electric terminal further comprises:
- a first transition portion coupling the first and second portions, the first transition portion comprises a height decreasing from the first height to the second height and a width decreasing from the first width to the second width.

8. The mount according to claim 6, wherein the electric terminal further comprises:
- a third portion having a third cross-section transverse with respect to the axis, the third cross-section being substantially equal to the first cross-section.

9. The mount according to claim 8, wherein the first and third cross-section areas are substantially congruent.

10. The mount according to claim 8, wherein the third cross-section is generally rectangular, and the third portion comprises a third width transverse with respect to the axis and a third height transverse with respect to the axis and perpendicular to the third width.

11. The mount according to claim 10, wherein the platform comprises:
- a platform height transverse with respect to the axis, the platform height being substantially equal to a difference between the first and second heights and equal to a difference between the second and third heights.

12. The mount according to claim 10, wherein the electric terminal further comprises:
- a first transition portion coupling the first and second portions; and
- a second transition portion coupling the second and third portions.

13. The mount according to claim 12, wherein the first transition portion comprises a height decreasing from the first height to the second height and a width decreasing from the first width to the second width, and the second transition portion comprises a height decreasing from the third height to the second height and a width decreasing from the third width to the second width.

14. A mount for an electrical device including a body and a plurality of electric contacts, the body having a base and at least one lateral face extending from the base, and the plurality of electric contacts projecting a first distance from the base, the mount comprising:
- a housing having a generally planar surface;
- an electric terminal contiguous to the generally planar surface and extending over a portion of the generally planar surface, the electric terminal including a solder portion being adapted to be soldered to at least one of the plurality of electric contacts; and a platform contiguous to the electrical terminal and adapted for spacing at a second distance the base from the solder portion of the electric terminal, the second distance being substantially equal to the first distance;

wherein the housing supports the terminal such that the terminal is contiguously sandwiched between the housing and the platform.

15. The mount according to claim 14, wherein the housing comprises:

a plurality of fingers projecting from the housing and adapted to contiguously engage the at least one lateral face.

16. The mount according to claim 15, wherein the plurality of fingers are distributed on opposite sides of the terminal.

17. The mount according to claim 14, wherein the housing comprises an electric insulator and the terminal comprises an electric conductor.

18. The mount according to claim 14, wherein the platform and the housing commonly comprise a homogenous molding.

19. An arrangement forming a mechanical and an electrical connection, the arrangement comprising:

an electric switch including:
 a body having a base; and
 a plurality of electric contacts projecting a distance from the base;

a plurality of electric terminals extending parallel to a first axis, each of the plurality of electric terminals including:

a first portion having a first rectangular cross-section oriented transversely with respect to the first axis, and the first rectangular cross-section having a first height measured parallel to a second axis perpendicular to the first axis and having a first width measured parallel to a third axis orthogonal to the first and second axes;

a second portion having a second rectangular cross-section oriented transversely with respect to the first axis, the second rectangular cross-section having a second height measured parallel to the second axis and having a second width measured parallel to the third axis, and the second rectangular cross-section being substantially congruent to the first rectangular cross-section; and a third portion having a third rectangular cross-section oriented transversely with respect to the first axis, the third rectangular cross-section having a third height measured parallel to the second axis and having a third width measured parallel to the third axis, the third height being less than the first and second heights, and the third width being less than the first and second widths, the third portion being soldered to at least one of the plurality of electric contacts; and a platform contiguously sandwiched between the third portion of each of the plurality of terminals and the base of the electric switch, the platform having a platform height measured parallel to the second axis from the third portions to the base, the platform height being substantially equal to the distance the plurality of electric contacts project from the base.

* * * * *